(12) United States Patent
Kasel

(10) Patent No.: US 7,279,644 B1
(45) Date of Patent: Oct. 9, 2007

(54) CONVEYED PRODUCT WEIGHT DISPLAY SYSTEM

(76) Inventor: Donald A. Kasel, 5911 Wolf Creek Pike, Brookville, OH (US) 45426

( * ) Notice: Subject to any disclaimer, the term of this patent is extended or adjusted under 35 U.S.C. 154(b) by 0 days.

(21) Appl. No.: 11/445,521

(22) Filed: Jun. 2, 2006

(51) Int. Cl.
G01G 23/36 (2006.01)
G01G 19/00 (2006.01)

(52) U.S. Cl. .............. 177/25.13; 53/502; 177/125; 177/145; 177/177

(58) Field of Classification Search ........... 53/502; 177/25.13, 125, 119–122, 145, 177
See application file for complete search history.

(56) References Cited

U.S. PATENT DOCUMENTS

| 3,846,958 | A | * | 11/1974 | Divan | 53/502 |
| 3,954,166 | A | | 5/1976 | Ives et al. | |
| 3,995,517 | A | * | 12/1976 | Smith | 83/13 |
| 4,065,911 | A | * | 1/1978 | Fagan | 53/53 |
| 4,428,179 | A | * | 1/1984 | Jordan et al. | 53/502 |
| 4,720,961 | A | * | 1/1988 | Jordan | 53/502 |
| 5,499,719 | A | | 3/1996 | Lindee et al. | |
| 6,151,866 | A | * | 11/2000 | Connell | 53/443 |
| 6,635,830 | B2 | | 10/2003 | Ring | |
| 6,712,221 | B2 | * | 3/2004 | Kvisgaard et al. | 209/645 |

* cited by examiner

Primary Examiner—Randy W Gibson
(74) Attorney, Agent, or Firm—Jacox, Meckstroth & Jenkins

(57) ABSTRACT

A series of products, such as bacon packages each having bacon slices carried by a card, are successively conveyed across an endless conveyor weighing scale to determine the weight of each product, and the products are then conveyed by an endless conveyor along a linear path through an inspection station. An elongated scrolling message display unit extends adjacent the linear path, and information characters corresponding to the weight of each product travel on the display unit in synchronism with the flow of the product on the conveyor to provide an inspection person with sufficient time to correct the weight of each off-weight product by adding or removing items from the product. A photosensor detects the leading edge of each product and cooperates to synchronize the location of weight information characters displayed on the display unit.

14 Claims, 3 Drawing Sheets

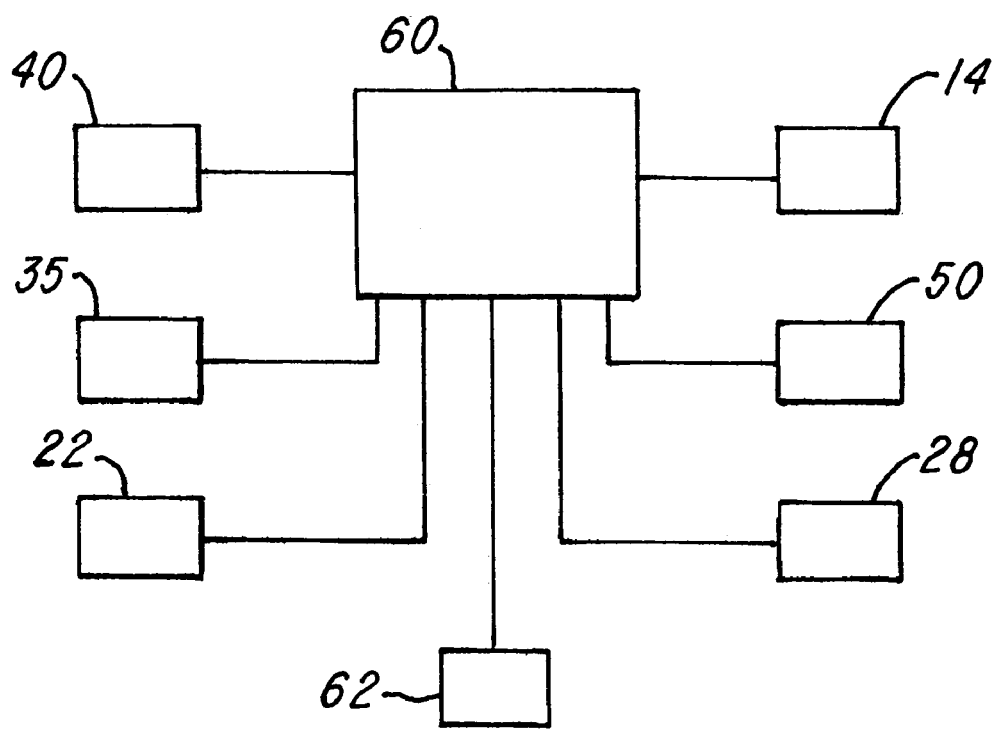

US 7,279,644 B1

CONVEYED PRODUCT WEIGHT DISPLAY SYSTEM

BACKGROUND OF THE INVENTION

This invention relates to a conveyor system for automatically weighing a series of successively supplied products which vary in weight and for displaying information corresponding to the weight of each product so that inspection personnel may take corrective action to bring each product to within a predetermined weight range. The system is ideally suited for handling food products such as successively supplied groups or batches of sliced bacon strips supplied by a conveyor from a slicing machine. Thus the system relates generally to the systems disclosed in U.S. Pat. No. 3,954,166, U.S. Pat. No. 5,499,719 and U.S. Pat. No. 6,635,830, the disclosures of which are herein incorporated by reference.

As an example, pork bellies are sliced into individual portion slices which are arranged in overlapping or shingled batches or groups, and it is necessary for each group to have a total weight within a predetermined weight range. The pork bellies are inconsistent in size and density, and it is difficult to calculate the exact number of slices which will be required to make a consistent net weight package that is in compliance with government regulations in regard to weight. Thus an inspection station is used downstream from the slicing machine to determine if the weight of each group or package is in compliance.

Commonly, the groups of bacon slices are successively fed across a conveyor weighing scale, and the groups determined to be too heavy or too light are diverted from the mainstream conveyor to be manually corrected. When off-weight groups are received, it is not known to what degree they deviate from the desired net weight package, and it is necessary for the inspection personnel to weigh the package, calculate the deviation, and add or subtract additional slices. This is usually a bottleneck in the production line, and it is desirable to provide an inspection system which provides for efficiently correcting the weight of each group or package of off-weight product and for minimizing the number of inspection personnel on the production line.

SUMMARY OF THE INVENTION

The present invention is directed to an improved method and apparatus for individually weighing a series of successively supplied products which vary in weight and which are then successively fed along a linear run or an endless conveyor at spaced intervals. An elongated scrolling message display unit extends adjacent and parallel to the linear run of the conveyor, and information characters corresponding to the weight of each product are displayed on the message display unit. The characters flow or travel in synchronism with the flow of the product on the conveyor along the linear path. One inspection operator may then conveniently and quickly correct the weight of each off-weight product which requires correction by adding or removing items from the product in order to place the product within a predetermined weight range. The method and apparatus of the invention may be used with a continuous supply of any product which includes a number of identical or similar items which have weight variation and for which it is necessary to take corrective action by adding or removing items to insure that each product is within a predetermined weight range.

Other features and advantages of the invention will be apparent from the following description, the accompanying drawings and the appended claims.

BRIEF DESCRIPTION OF THE DRAWINGS

FIG. 3 is a diagram of a control system for the apparatus shown in FIGS. 1 and 2.

DESCRIPTION OF THE PREFERRED EMBODIMENT

Figure 1:
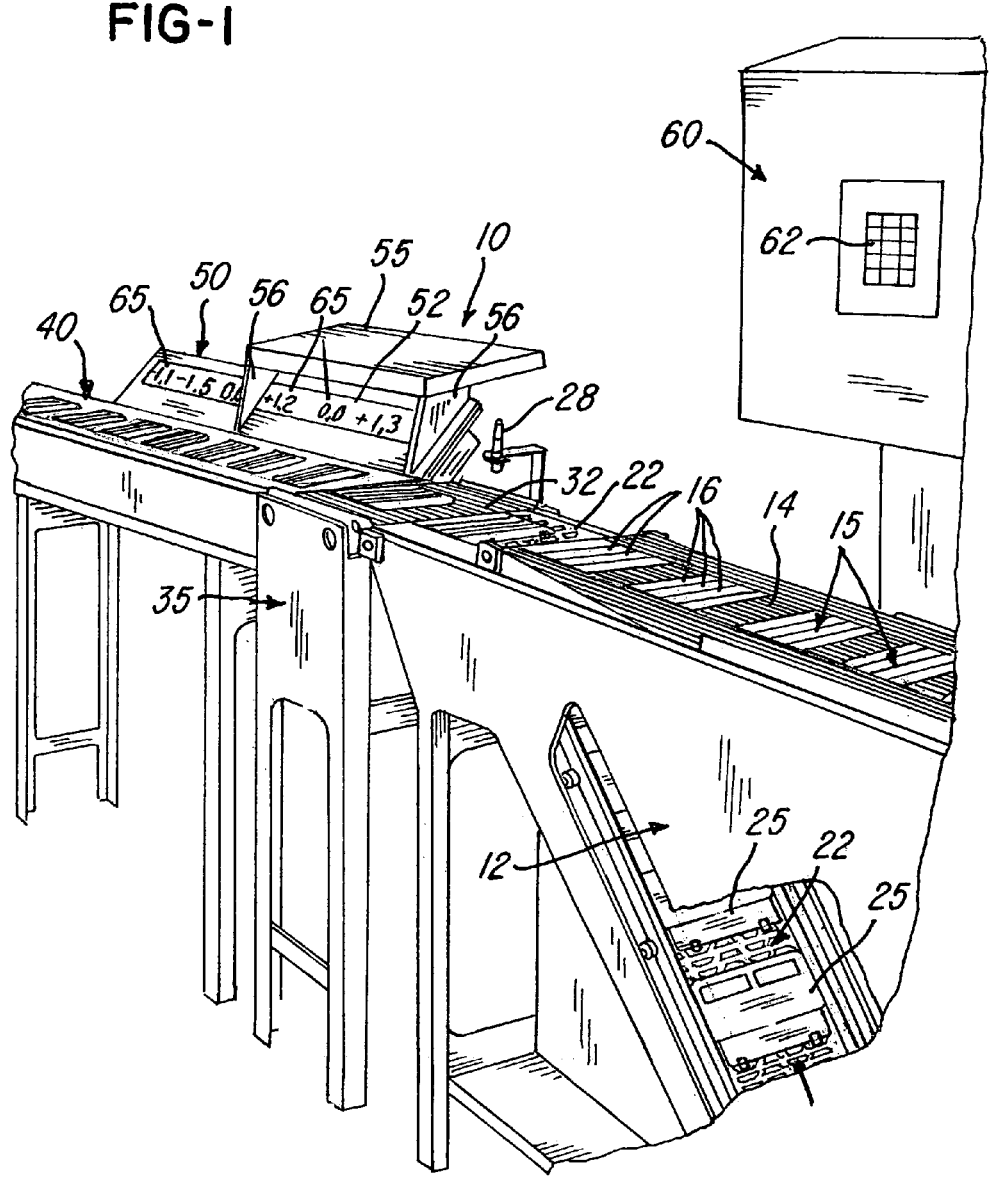
FIG. 1 is a perspective view of a conveyor weighing and display system or apparatus constructed in accordance with the invention for successively weighing a series of food products and for displaying information characters corresponding to the weight of each product in accordance with the invention.
Figure 2:
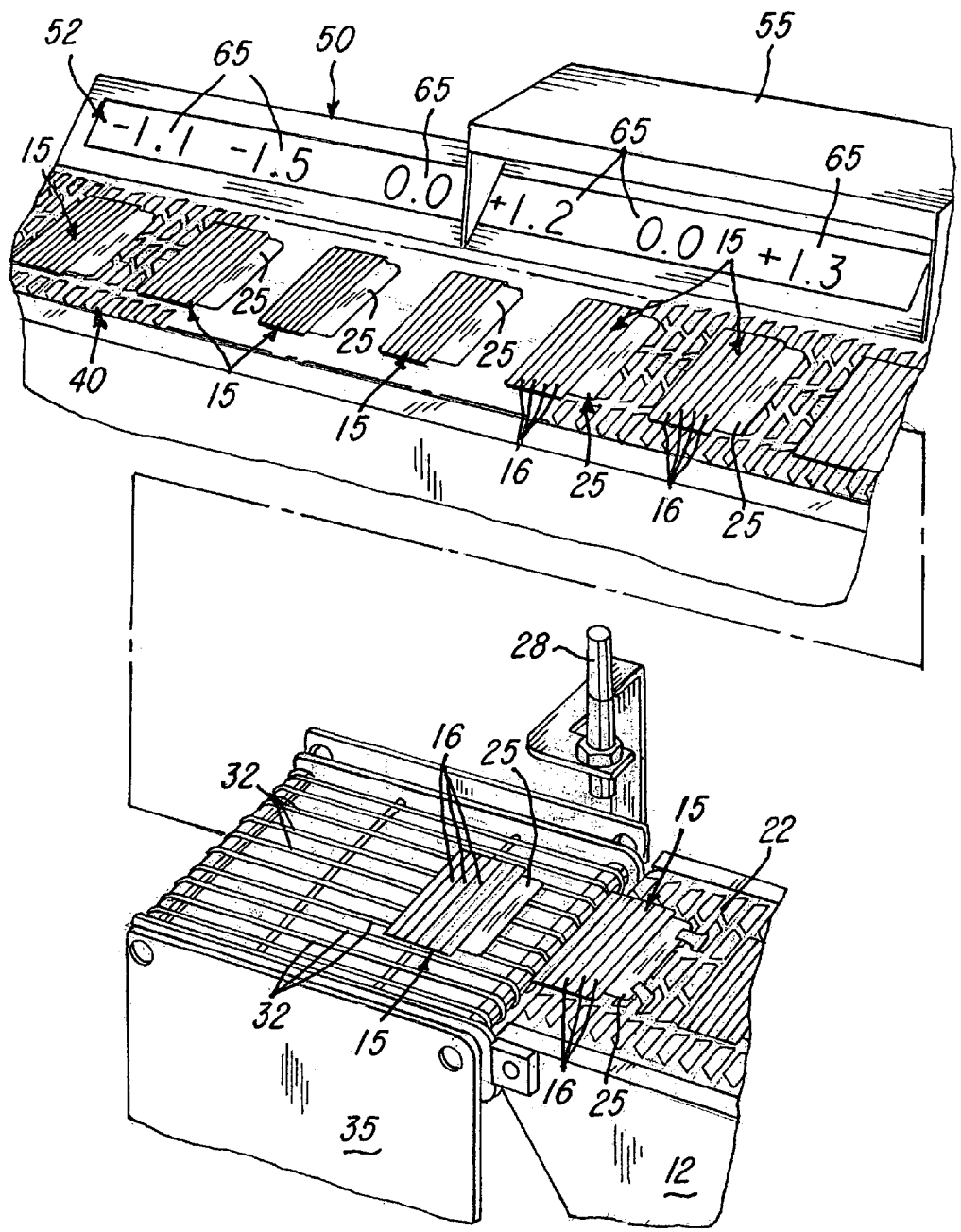
FIG. 2 is an enlarged fragmentary perspective view of the conveyor weighing scale and display system shown in FIG. 1.

FIGS. 1 and 2 illustrate a conveyor weighing and display system 10 constructed in accordance with the invention and which includes a card dispenser unit 12 having an upper endless conveyor 14 with an elongated upper run which receives and conveys groups of food products 15 at longitudinally spaced intervals along the upper run of the conveyor. The food products 15 illustrated are in the form of batches or groups of overlapping or shingled strips 16 of bacon which are conveyed by the conveyor 14 from a bacon slicing machine (not shown). One form of card dispenser unit 12 which has provided satisfactory results is manufactured by Kasel Engineering LLC in Trotwood, Ohio. This dispenser unit includes another or lower elongated endless conveyor 22 which carries a series of cardboard carrier panels 25 from the bottom of a supply stack upwardly and forwardly so that a carrier panel 25 is fed directly under each food product 15 of overlapping bacon strips 16. Each of the conveyors 14 and 22 have a variable speed drive so that the feed or advancement of the carrier panels 25 may be precisely timed and synchronized with the advancement or feed of the food products 15 on the conveyor 14.

As each food product 15 and its supporting carrier panel 25 advance forwardly and horizontally from the conveyor 14, an optical sensor 28 detects or senses the leading edge and the trailing edge of each carrier panel 25. Each panel 25 and supporting food product 15 are received by the upper run of parallel spaced endless conveyor belts 32 (FIG. 2) of a conveyor weighing scale unit 35, commonly referred to as a "check weigher". A conveyor weighing scale unit which has provided satisfactory results is also produced by Kasel Engineering LLC in Trotwood, Ohio. The conveyor scale unit 35 or check weigher includes load cells which sense and determine the precise weight of each food product 15 and its supporting carrier panel 25 while the assembly is moving on the belts 32 and has an electrical output corresponding to the weight of each food product 15 and support panel 25. The food products 15 and their corresponding carrier panels 25 are successively fed by the conveyor weighing scale unit 35 onto the upper linear run of an endless conveyor 40 which has a variable speed drive and is also produced by Kasel Engineering LLC. This conveyor has pivotally connected plastic elements or links which define openings to provide for an extended service life and for conveniently cleaning of the conveyor.

In accordance with the invention, an elongated scrolling message display unit 50 extends parallel to and adjacent the upper linear run of the conveyor 40. A message display unit 40 which has provided desirable results is produced by EZ Automation in Bettendorf, Iowa and has a Model Number of EZMT-1L40C. This unit has a length of about six feet and is capable of displaying alpha numeric characters in various colors on a longitudinally extending display screen 52 and in one line of forty characters with each character having a height of about two inches. A computer program or software for operating the display unit 50 is available from Kasel Engineering LLC. The longitudinally extending display screen 52 permits the displayed characters to travel along the length of the unit. A supporting shelf 55 is supported by brackets 56 above the display unit 50 and extends downstream from the conveyor weighing scale 35 over a portion of the display unit.

Referring to FIG. 3, the variable speed drives for the conveyor 40 and the conveyor weighing scale unit 35 and the drives for the conveyors 14 and 22 are controlled from a control center or box 60 which has a touch-type manual control panel 62 for entering control information and is also connected to the display unit 50 as well as the optical sensor 28. The control for the display unit 50 is programmed to display information characters 65 corresponding to the weight of each food product 15, and the information travels along the screen 52 of the display unit 50 in synchronism with the linear flow rate or travel of the corresponding food product 15 on the conveyor 40. The traveling information characters 65 displayed on the screen 52 and which corresponds to the weight of the corresponding laterally aligned food product 15 on the conveyor 40 may be selected in various forms, whatever is desired and most convenient to be used by an inspection operator standing adjacent the conveyor 40 in front of the unit 50.

For example, the illustrated displayed information character 65 may read "0.0" to indicate that the corresponding food product 15 is within a desired weight range and does not require any correction. If a group or batch of bacon slices 16 or food product 15 is underweight, the corresponding displayed information may read "+1.3" indicating that the food product requires an additional 1.3 bacon slices 16. The inspection operator would then remove one larger bacon slice from a supply of slices 16 on the shelf 55 and place it with the food product or bacon slices 16 on the corresponding carrier panel 25. If the food product 15 was overweight, the information characters displayed on the screen 52 in lateral alignment with the food product on the conveyor 40, may read "−1.5", indicating that at least one larger bacon slice 16 should be removed from the corresponding group or batch of bacon slices 16 or food product 15 on the conveyor 40 so that the product is within the desired weight range.

From the drawings and the above description, it is apparent that a weighing, conveying and displaying system constructed in accordance with the invention provides desirable features and advantages. For example, by displaying information characters corresponding to the weight of each package or product on the display unit 50 and having the information travel in synchronism with the corresponding product on the conveyor 40, sufficient time is provided for one inspection person to correct the off-weight packages or products while the products are being conveyed on the fly. As a result, the invention reduces the number of inspection personnel required, especially those previously required when the off-weight packages or products are removed from the main conveyor stream. Thus the invention provides for a significantly more efficient method for correcting off-weight packages or products. The additional personnel previously required for correcting off-weight packages or products may then be used for performing other tasks such as trimming or straightening mishandled packages or products. The end result is a significantly higher production rate with less labor.

While the method and form of apparatus herein described constitute a preferred embodiment of the invention, it is to be understood that the invention is not limited to the precise method and form of apparatus described, and that changes may be made therein without departing from the scope and spirit of the invention as defined in the appended claims.

What is claimed is:

1. A method of correcting the weights of off-weight products within a continuous supply of products, comprising the steps of successively conveying a series of products to a weighing scale positioned to weigh each product as the product passes across the scale, sensing the weight of each product with the weighing scale, successively conveying the series of weighed products from the weighing scale along a generally linear path of a conveyor, positioning an elongated scrolling message display unit adjacent the linear path of the conveyor, displaying on the display unit weight information characters corresponding to the weights of the products sensed by the scale, and moving the weigh information character corresponding to the weight of each product longitudinally on the display unit and in synchronism with the flow of the product along the linear path of the conveyor to provide for efficiently correcting the weight of each off-weight product according to a predetermined weight for the product while the products are moving on said conveyor.

2. A method as defined in claim 1 wherein each of the products comprises a plurality of items carried by a support member, and the weight information characters moving longitudinally along the display unit correspond to an addition or a removal of one or more of the items on the corresponding support member.

3. A method as defined in claim 2 and including the step of successively feeding the support members directly under the items in each of the products.

4. A method as defined in claim 1 and including the step of positioning a shelf adjacent the display unit to support a supply of items used to correct the weights of the off-weight products.

5. A method as defined in claim 1 and including the steps of sensing an edge of each product conveyed across the weighing scale, and controlling the rate of linear movement of the weight information characters on the display unit with respect to the edge of the product.

6. A method of correcting the weights of off-weight food products within a continuous supply of the food products and adapted to receive strips of bacon supported by carrier cards, comprising the steps of successively conveying a series of food products to an endless conveyor weighing scale positioned to weigh each food product as the food product passes across the scale, sensing the weight of each food product with the scale, successively conveying the series of weighed food products from the weighing scale along a generally linear path of an endless conveyor, positioning an elongated scrolling message display unit adjacent the linear path of the conveyor, displaying on the display unit weight information characters corresponding to the weights of the food products sensed by the scale, and moving the weight information characters corresponding to the weights of the food products longitudinally on the display unit and in synchronism with the flow of the food products along the linear path of the conveyor to provide for efficiently correcting the weight of each off-weight food product according to a predetermined weight for the product while the food products are moving on the conveyor.

7. A method as defined in claim 6 wherein each of the food products comprises multiple strips of bacon carried by a support card, and the off-weight information characters moving longitudinally along the display unit correspond to an addition or a removal of one or more of the strips of bacon on the corresponding support panel.

8. A method as defined in claim 7 and including the step of successively feeding the support cards under the slices of bacon with an endless conveyor.

9. A method as defined in claim 7 and including the step of positioning a shelf above and adjacent the display unit to support a supply of strips of bacon used to correct the weights of the off-weight bacon strips on the support panels.

10. A method as defined in claim 7 and including the steps of sensing at least an edge of each support card conveyed across the weighing scale, and synchronizing the rate of linear movement of the weight information characters on the display unit with respect to the edges of the corresponding support cards.

11. Apparatus for weighing a series of successively supplied products having variation in weights and for displaying information corresponding to the weight of each product, comprising an endless conveyor weighing scale positioned to receive each product and for weighing the product as the product passes across said scale, an endless conveyor positioned to receive the series of weighed products from said weighing scale and for successively conveying the products along a generally linear path, an elongated scrolling message display unit extending adjacent and generally parallel to said linear path of said conveyor, and said display unit being effective to move weight information characters corresponding to the weight of each product longitudinally along said display unit and in synchronism with the movement of the corresponding product along said linear path of said conveyor to provide for conveniently and efficiently correcting the off-weight products according to a predetermined weight for the product while the products are moving on said conveyor.

12. Apparatus as defined in claim 11 and including an endless conveyor upstream of said weighing scale for successively feeding support panels under the products.

13. Apparatus as defined in claim 11 and including a shelf positioned adjacent said display unit for supporting a supply of items used to correct the weight of each off-weight product.

14. Apparatus as defined in claim 11 and including an optical sensor positioned to sense an edge of each product conveyed across said weighing scale, and the rate of linear movement of the weight information characters on said display unit for each product are synchronized with the edge of the corresponding product.

* * * * *